(12) United States Patent
Subbiah et al.

(10) Patent No.: US 8,683,262 B1
(45) Date of Patent: Mar. 25, 2014

(54) SYSTEMS AND/OR METHODS FOR RAPID RECOVERY FROM WRITE-AHEAD LOGS

(71) Applicant: Terracotta Inc., San Francisco, CA (US)

(72) Inventors: Saravanan Subbiah, San Mateo, CA (US); Chris Dennis, Martinsburg, WV (US); Timothy Wu, Fremont, CA (US); Myron Scott, Orinda, CA (US)

(73) Assignee: Terracotta Inc., San Francisco, CA (US)

( * ) Notice: Subject to any disclaimer, the term of this patent is extended or adjusted under 35 U.S.C. 154(b) by 0 days.

(21) Appl. No.: 13/923,880

(22) Filed: Jun. 21, 2013

(51) Int. Cl.
*G06F 11/00* (2006.01)

(52) U.S. Cl.
USPC .................................. 714/16; 714/19; 714/20

(58) Field of Classification Search
None
See application file for complete search history.

(56) References Cited

U.S. PATENT DOCUMENTS

| | | | | |
|---|---|---|---|---|
| 5,278,982 | A * | 1/1994 | Daniels et al. ........................ | 1/1 |
| 5,325,519 | A * | 6/1994 | Long et al. ...................... | 714/15 |
| 5,923,833 | A * | 7/1999 | Freund et al. .................. | 714/19 |
| 6,769,074 | B2 * | 7/2004 | Vaitzblit ........................ | 714/16 |
| 6,976,022 | B2 | 12/2005 | Vemuri et al. | |
| 2012/0222005 | A1 | 8/2012 | Harris et al. | |
| 2012/0323849 | A1 | 12/2012 | Garin, Jr. et al. | |

FOREIGN PATENT DOCUMENTS

| | | |
|---|---|---|
| EP | 0 280 773 | 9/1988 |
| EP | 0 295 424 | 12/1988 |
| EP | 0 336 546 | 10/1989 |
| EP | 0 465 018 | 1/1992 |
| EP | 0 516 900 | 12/1992 |
| EP | 0 549 325 | 6/1993 |

OTHER PUBLICATIONS

C. Mohan et al., "ARIES: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162. http://www.cs.berkeley.edu/~brewer/cs262/Aries.pdf.
Wikipedia—Journaling Block Device [retrieved online Jun. 20, 2013]. http://en.wikipedia.org/wiki/Journaling_block_device.
Wikipedia—Journaling Flash File System Version 2 (JFFS2) [retrieved online Jun. 20, 2013]. http://en.wikipedia.org/wiki/JFFS2.

(Continued)

*Primary Examiner* — Scott Baderman
*Assistant Examiner* — Jason Bryan
(74) *Attorney, Agent, or Firm* — Nixon & Vanderhye, P.C.

(57) ABSTRACT

Certain example embodiments provide a single pass, reverse chronological approach to write-ahead log recovery, enabling space- and time-efficient the recovery of stored data from large write-ahead logs to a transient storage medium. The techniques described herein can in certain instances enable fast and efficient recovery, even in scenarios where at the time of a failure requiring such a recovery the live log is potentially multiple terabytes or larger in size. Certain example embodiments make use of a filtering mechanism (e.g., involving potentially stateful delete, skip, and/or transaction filters), a key/value property (allowing a live set of data, once identified, to be applied in any arbitrary order), etc. A simplified environment with a small closed set of mutative operations allows for the performing of recovery backwards by scanning the log from the most recent written record backwards in time (and, in other words, finishing with the oldest record).

20 Claims, 8 Drawing Sheets

(56) References Cited

OTHER PUBLICATIONS

Wikipedia—Unsorted Block Image File System (UBIFS) [retrieved online Jun. 20, 2013]. http://en.wikipedia.org/wiki/UBIFS.

Wikipedia—LogFS [retrieved online Jun. 20, 2013]. http://en.wikipedia.org/wiki/LogFS.

Wikipedia—ReiserFS [retrieved online Jun. 20, 2013]. http://en.wikipedia.org/wiki/RieserFS.

Wikipedia—Write-Ahead Logging (WAL) [retrieved online Jun. 20, 2013]. http://en.wikipedia.org/wiki/Write-ahead_logging.

* cited by examiner

| LSN | Key 1 | | Key 2 | |
|---|---|---|---|---|
| 5 | PUT | 3 | | |
| 4 | | | PUT | -1 |
| 3 | PUT | -1 | | |
| 2 | | | REM | 1 |
| 1 | | | PUT | -1 |

FIG. 7

SYSTEMS AND/OR METHODS FOR RAPID RECOVERY FROM WRITE-AHEAD LOGS

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software code as described below: Copyright © 2012 Terracotta Inc., All Rights Reserved.

TECHNICAL FIELD

Certain example embodiments described herein relate to systems and/or methods for use with write-ahead logs. More particularly, certain example embodiments described herein relate to systems and/or methods for rapid recovery from write-ahead logs, e.g., for use in in-memory storage and large scale Big Data applications. Certain example embodiments provide a single pass, reverse chronological approach to write-ahead log recovery, enabling space- and time-efficient recovery of stored data from large write-ahead logs to a transient storage medium.

BACKGROUND AND SUMMARY OF EXAMPLE EMBODIMENTS OF THE INVENTION

Write-ahead logging (WAL) in general refers to a family of techniques for providing atomicity and durability, e.g., in connection with database systems. In a system using WAL, all modifications are written to a log before they are applied, and "undo" and "redo" information typically is stored in the log. WAL can be useful in instances where an application program encounters a fault (e.g., its supporting hardware failing, losing power, etc.) while performing an operation. By using a write-ahead log, the application program may be able to check the log and compare what it was supposed to be doing when the fault occurred to what actually was done. In other words, the application may be able to consult the log to help determine whether the operation it was performing succeeded, partially succeeded, or failed, and then make a decision to undo what it had started, complete what it had started, keep things as they are, and/or take some other action.

Write-ahead logs are mainly used in three areas, namely, as a transaction log in a database system that provides guaranteed atomicity and durability (using the common ACID definitions), as a journal in a journaled file system implementation, and as the log in a log structured file system. Each of these areas is discussed, in turn, below. In the meantime, it is noted that, as is known, ACID refers to Atomicity, Consistency, Isolation, and Durability, which are a set of properties that help guarantee that database transactions are processed reliably. "Atomicity" refers to each transaction being "all or nothing"; "consistency" helps ensure that any transaction will bring the database from one valid state to another; "durability" implies that once the transaction has been committed, it will remain so even in the event of power loss, crashes, errors, etc.; and "isolation" helps ensure that concurrent execution of transactions results in a system state that would have resulted if both the transactions were executed serially.

The Algorithm for Recovery and Isolation Exploiting Semantics (ARIES) log recovery protocol has become a standard technique for database transaction logs. ARIES in general involves maintaining dirty page tables (DPT) and transaction tables (TT) in a log. The DPT maintains a record of all of the pages that have been modified and not yet written back to disc, and the first Sequence Number that caused that page to become dirty. The TT, on the other hand, includes all of the transactions that are currently running, and the Sequence Number of the last log entry they caused. A checkpoint is a known good point from which a database engine can start applying changes contained in the log during recovery, e.g., after an unexpected shutdown or crash. In the context of the ARIES protocol, a DPT and TT together form a checkpoint.

Recovery from a checkpoint according to the ARIES protocol generally involves three phases, e.g., as shown in FIG. 1. First, an analysis phase involves scanning forward from the checkpoint, updating the dirty page and transaction tables along the way. Second, a redo phase scans forward through the log again, checking log sequence numbers (LSNs) of the found entries against the DPT, and then subsequently against the page itself, and redoing actions, if necessary. Third, an undo phase unwinds any torn transactions (e.g., transactions that are not completely written and then committed) at the time of the crash by traversing the log backwards, e.g., using backchaining pointers through each transaction. Some commercially available products have created variants of the ARIES protocol, e.g., focusing on ways of separating redo and undo logs into separate log structures, handling node failure and recovery in clustered databases, etc. A chaining pointer refers to the part of a data item in a chained list that gives the address of the next data item, and a backchaining pointer similarly refers to the part of a data item in a chained list that gives the address of the previous data item.

A journaled file system refers to a file system that keeps track of the changes that will be made in a journal (usually using a circular log in a dedicated area of the file system) before committing them to the main file system. A Journaled Block Device (JBD) is the block device layer within the Linux or other kernel used by ext3, ext4, and OCFS2 (Oracle Cluster Filesystem), for example. JBD2 involves a three-pass process, e.g., as shown in FIG. 2. The first pass involves scanning forward through the log for the last valid commit record. This establishes the end of the log. The second pass involves scanning forward through the log and assembling a list of revoked blocks, which are blocks that have been invalidated by subsequent log writes, where each transaction commit writes out the list of blocks it revokes to the log at commit time. The third pass involves scanning forward through the log and writing all of the non-revoked blocks.

There are several types of log structured file system. For instance, the Journaling Flash File System version 2 (JFFS2) performs a complete scan of the medium on mount and constructs an in-memory representation of the directory structure of the file system. Revoked log entries can be identified in this scan as each node in JFFS2 is versioned, with only the most recent version for each block being active. JFFS2, oftentimes used in flash memory systems and included in the Linux kernel, is the successor to JFFS, which also is a log-structured file system, e.g., for use on NOR flash memory devices on the Linux operating system.

The Unsorted Block Image File System (UBIFS) was originally known as JFFS3 and in essence is a hybrid of ReiserFS and JFFS2. It stores the file system as one large B-tree on the medium, and updates to the file-system are written to the various journal blocks that are scattered through the file system. Mutations on the B-tree are recorded in a write-back journal cache (the "journal tree"). Mutative operations are operations on a system that trigger writes to the write-ahead log, and user mutations are mutations sourced from outside the system (e.g., where the nature of which is sometimes outside the systems control). The journal tree is then periodically written down in to the medium. Recovery at mount time involves identifying the journal blocks and then rescanning them to rebuild the journal tree. They also may use a wandering tree where the lowest node in the tree (i.e., the data) is written first and each node is written ascending the tree, until the root node is updated.

UBIFS may be used with raw flash memory media and is a competitor to Log File System (LogFS) as a file system. LogFS is a Linux log-structured and scalable flash file system, oftentimes used on devices with large flash memories. LogFS works in a manner similar to UBIFS, but without the journal tree, e.g., in that it uses a wandering tree to ensure file system updates are atomic.

Database and other information storage systems sometimes use a write-ahead log as transaction or redo/undo log to support transactional, atomically durable write operations. In general, database systems and journaling file systems generally involve the log acting as a supporting data structure to the primary persistent database storage. The bulk of the database is stored in the primary storage, typically with only the recent potentially uncommitted write traffic residing in the log. This means the transaction log is small in size and frequently kept with a strict size bounds (e.g., by forcing flushing of data to the primary data structure when the log becomes too large). The database also typically supports a large set of different mutative operations, and multiple mutative operations may operate on complex overlapping regions of the database.

The complex nature in which mutative operations can interact within a database means that a chronologically forward replay oftentimes is the only simple strategy for log recovery in such a system. Because the log size is kept both bounded and small by continually flushing changes to the primary persistent data structure, the effect of taking multiple passes over the log, and replaying potentially redundant writes on the primary persistent data structure, oftentimes is minimal.

Unfortunately, however, when the size of the live log becomes quite large, database systems/journaling file systems do not work well. For example, a large live log (which could potentially reach multiple terabytes), coupled with the potential for a significant number of redundant log entries, implies that the overhead of not skipping redundant entries, and having to take a two pass approach, could result in too much wasted effort.

Log structured file systems are motivated to use a write-ahead log approach by the restrictions of the physical media on which they are usually used. For instance, write-once media cannot be write-in-place (e.g. CD-R), and NAND/NOR based flash media cannot atomically write-in-place. For these log structured file systems, there generally is no additional persistent data storage. Instead, the log is the system of record. The recovery approach here thus involves either rescanning a small portion of the log that represents the potentially uncommitted directory structure mutations, or rescanning the entire log in a forward direction from an arbitrary point in the log (e.g., the beginning of the medium) and building a transient index of the file system to enable efficient access. In the former case, the recovery process proceeds in a similar manner (and with similar requirements) to the approach used in database transaction logs. In the latter case, although a complete scan of the log is performed, the recovery is not reading the entire dataset, and it is only the metadata needed to rebuild the index that is read.

Sometimes, however, recovery of the entire log is necessary and/or desirable. However, requiring all of the data to be read into volatile memory may make it difficult or impossible to bear the overhead of reading the entire log (including any redundant records) in an effort to find only live data.

Thus, it will be appreciated that it would be desirable to improve upon existing write-ahead log techniques, e.g., for use in in-memory storage and large scale Big Data applications, where it may be necessary or desirable to use a log to persist data, with the only read traffic occurring during recovery while potentially providing restartability, keeping everything in memory, and/or minimizing persistence overhead. In other words, it would be desirable to improve upon current write-ahead log approaches used in relational databases and file systems, which are suboptimal when applied to in-memory store and Big Data scenarios.

As will be appreciated by those skilled in the art, most conventional write-ahead logs are used to support primary storage. Certain example embodiments involve a change to this paradigm, however, in the sense that the log may be the only persistent storage in the system and may be recovered to faster transient storage for runtime use.

In certain example embodiments, the use of a pure key-value schema for the stored data, and simplified set of mutative operations, leads to fewer restrictions on the potential set of recovery processes than conventional write-ahead log based systems. More particularly, using the key/value property allows the live set of data, once identified, to be applied in any arbitrary order, in certain example embodiments. Because recovery is targeted at locating the live set of data, optimizations for eliminating redundant reads from the log (and/or writes to the primary transient storage) advantageously may have a much greater effect on recovery time than they would in a more conventional write-ahead log scenario.

One aspect of certain example embodiments relates to a single pass, reverse chronological approach to write-ahead log recovery. This example approach may in certain instances allow for minimizing service downtime when availability is contingent on the completion of the recovery process.

Another aspect of certain example embodiments relates to recovering data from a transactional write-ahead log for use in in-memory storage and large scale Big Data applications.

Another aspect of certain example embodiments relates to approaches that enable the recovery of all stored data from large write-ahead logs to a transient storage medium, in a space- and time-efficient manner, e.g., as opposed to approaches that focus on either recovering a subset of the data or recovery from small data logs.

Still another aspect of certain example embodiments relates to building a system that deals with the recovery of live data from a very large write-ahead log in a simplified environment with a small closed set of mutative operations, which allows for the alternative approach of performing recovery backwards by scanning the log from the most recent written record backwards in time (and, in other words, finishing with the oldest record).

Yet another aspect of certain example embodiments relates to a reversal in the log scanning direction as compared to prior recovery approaches, which advantageously makes it possible to at least sometimes eliminate torn transactions, identify the most recent data (the live set), and/or avoid reading or replaying revoked and redundant data. FIG. 3 schematically demonstrates the single pass, reverse-chronological order approach of certain example embodiments.

In certain example embodiments, a recovery method for a computer system including a processor and a memory that has encountered a fault is provided. Actions taken by the computer system are loaded to the memory from a write-ahead log maintained on a non-transitory computer readable storage medium, the write-ahead log storing the actions in chronological order. The actions stored in the memory are run through a series of filters in order to identify irrelevant actions that do not need to be replayed in order to recover from the fault. Using the processor, the actions from the memory are replayed until the entire log is replayed in reverse-chronological order, notwithstanding the identified irrelevant actions that do not need to be replayed. The computer system is transitioned from a recovery state to a normal operation state, following the replaying.

In certain example embodiments, there is provided a non-transitory computer readable-storage medium tangibly that stores instructions that are performable by a processor of a computer system that needs to be recovered as a result of a fault taking place. The instructions that are provided include instructions for loading actions taken by the computer system from a disk-backed log that stores the actions in chronological order to memory of the computer system, where the actions loaded from the log are mutative actions that occurred within a time period of interest defined as being between a predetermined time before the fault and the fault; running the actions stored in the memory through a series of filters in order to identify irrelevant actions that do not need to be replayed in order to recover from the fault; replaying, using the processor, the actions from the memory until the entire log for the time period of interest is replayed in reverse-chronological order, while ignoring the identified irrelevant actions that do not need to be replayed; and transitioning the computer system from a recovery state to a normal operation state, following the replay. There is no data dependency between actions recorded in the log and the log is maintained (and in some cases processed via skip chains) such that older actions cannot invalidate newer actions.

In certain example embodiments, a computer system operable in normal and recovery modes is provided. The computer system comprises a processor and a memory. A non-transitory computer readable storage medium tangibly stores a log that stores actions of preselected types taken by the computer system in chronological order. Recovery program logic is configured to operate in connection with the processor when the computer system is in recovery mode to load actions from the log into the memory and filter out irrelevant actions that do not need to be replayed. An object manager is configured to cooperate with the processor when the computer system is in recovery mode to restore objects in memory in reverse-chronological order by replaying the actions from the memory in reverse-chronological order. The processor is further configured to (a) place the computer system in recovery mode when a fault is detected and (b) transition the computer system from recovery mode to normal mode once the object manager has finished replaying all of the actions that occurred within a time period of interest leading up to the fault, except for the filtered out irrelevant actions.

These features, aspects, advantages, and example embodiments may be used separately and/or applied in various combinations and sub-combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 7 schematically shows skip chains in accordance with certain example embodiments;

DETAILED DESCRIPTION OF EXAMPLE EMBODIMENTS OF THE INVENTION

Certain example embodiments relate to a single pass, reverse chronological approach to write-ahead log recovery, e.g., where it becomes possible to recover data from a transactional write-ahead log for use in in-memory storage and large scale Big Data applications in a space- and time-efficient manner.

The inventors have recognized that enforcement of the following two ideas allow for simplification of the recovery process. First, in certain example embodiments, all actions are self-contained, meaning that there will be no data dependency between actions. (e.g., certain example embodiments do not permit actions like, "increment a field by 1"). Second, in certain example embodiments, no older action can invalidate a newer action. These facts allow certain example embodiments to perform recovery operations "backwards in time" (that is, recovering the newest actions first), filtering out any actions invalidated by newer actions.

By exploiting the first idea discussed above, certain example embodiments permit any action that has been superseded or otherwise rendered invalid by a later action to be completely dropped. According to this idea, it is not necessary to base the recovered state of the system on anything by the most recent actions. To support multiple reasons for invalidating any given action, filters may be chained together, with each filter in the chain performing one of the following three actions:

Filter (drop the action from further processing),
Pass through (delegate to the next filter in the chain), or
Mark as invalid (but also pass through to allow later filters in the chain to update an internal state).

Filters are generally stateful in certain example embodiments. What they filter out may, for example, depend on what actions they have already seen. Delete, skip, and transaction filters may be provided. A delete filter may, for example, handle filtering out actions on deleted maps. A map in this context may be thought of as a subset of keys within the log. Observed "Delete" actions may add an identifier to the set that will filter all previous actions done with the given identifier. A skip filter may handle filtering out individual put entries invalidated by later puts. A transaction filter may filter out actions from torn transactions.

By exploiting the second idea discussed above, certain example embodiments make it possible to pass actions through the filters in reverse order. Because no action can invalidate a subsequent action in certain example embodiments, the filter state actually may be optimally determined by passing through the filters backwards in time. This may allow the filters to update themselves with information about what earlier actions are no longer valid, trimming down the set of actions to be reapplied.

Figure 1:
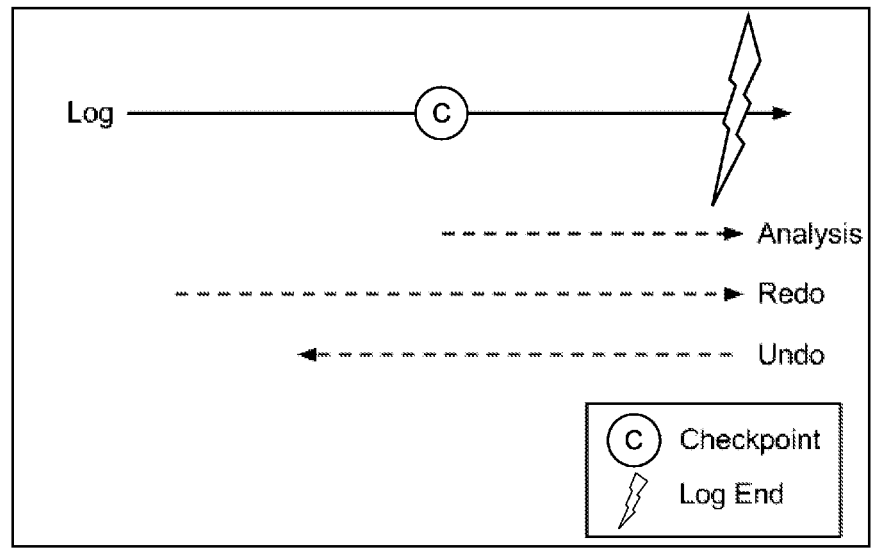
FIG. 1 demonstrates how recovery from a checkpoint can be performed according to the ARIES protocol.
Figure 2:
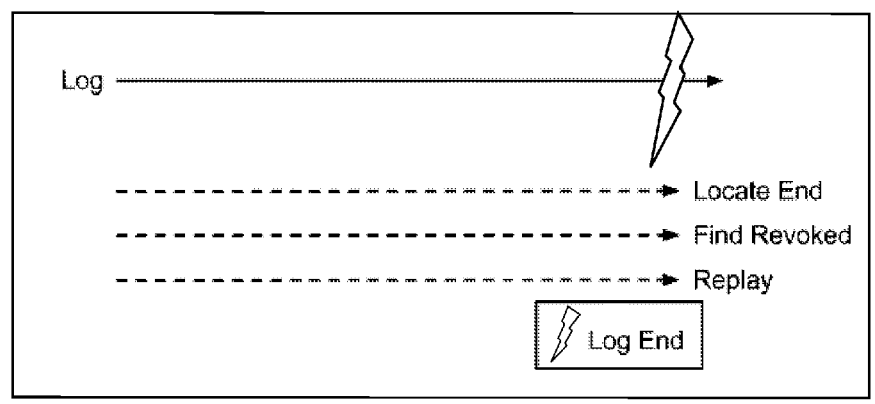
FIG. 2 demonstrates how recovery can be performed in connection with a three-pass process typical of a Journaled File System.
Figure 3:
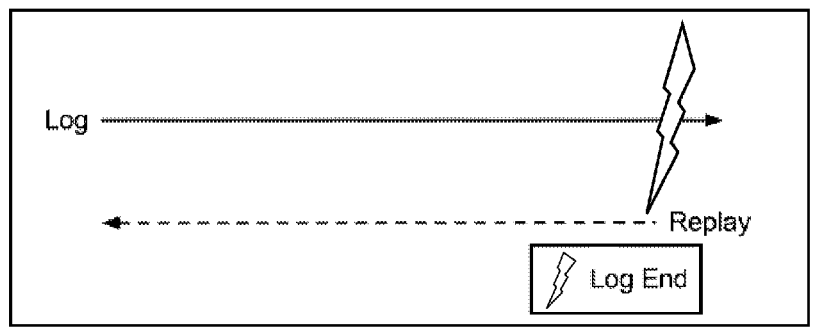
FIG. 3 schematically demonstrates the single pass, reverse-chronological order approach of certain example embodiments.
Figure 4:
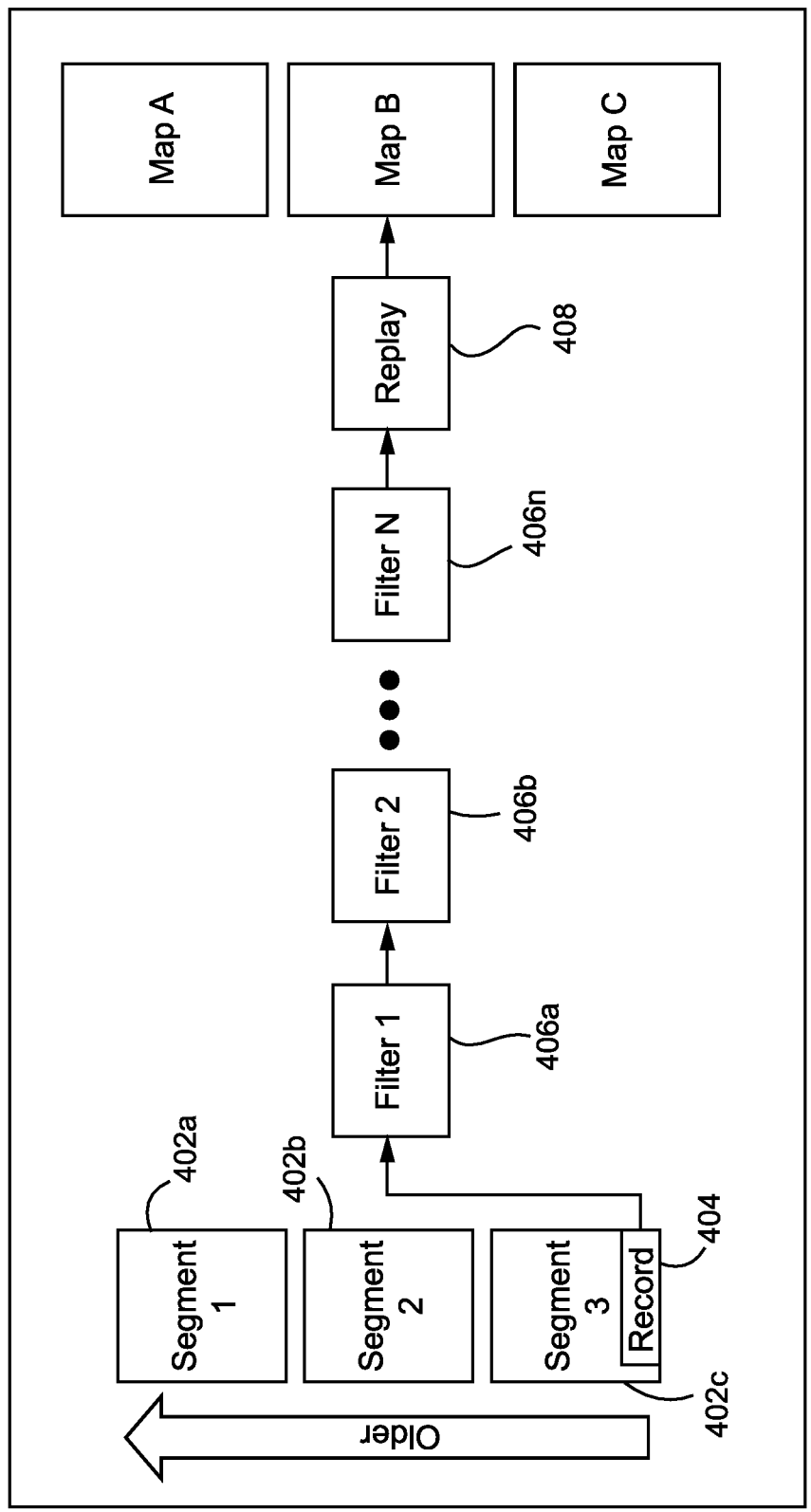
FIG. 4 is a block diagram illustrating how certain example embodiments operate.

FIG. 4 is a block diagram illustrating how certain example embodiments operate. As shown in FIG. 4, the log is divided in a plurality of segments 402a-402c that contain actions for potential replay. Each action record 404 in each segment is potentially run through a plurality of filters 406a-406n, and actions that successfully pass through all filters 406a-406n are replayed using the appropriate replay logic 408, which updates objects in the maps A-C, as appropriate. In the FIG. 4 example, at least one object in map B is updated.

Example Implementation

An example implementation will now be provided, with reference to a computer system including processing resources that include at least one processor and a memory. The example computer system also includes non-transitory data storage areas. It will be appreciated that although certain example code snippets are provided below in Java, other programming languages and/or implementations are of course possible. In addition, although certain example embodiments are described in connection with a standalone computer, the example techniques described herein may be used in connection with a networked computer environment with homogeneous or heterogeneous components. The term "Fast Restartable Store" and the abbreviation "FRS" are used herein for ease of reference in describing various features of certain example embodiments. However, it is to be understood that references to what the FRS is, how it operates, etc., are provided by way of example and without limitation. In other words, the term "Fast Restartable Store" and the abbreviation "FRS" are essentially shorthand for the phrase "in an example embodiment" or the like.

When a computer system with FRS recovery enabled is first restarted, it enters the recovering state. In this state, user mutations are blocked until the system has finished the recovery process.

Figure 5:
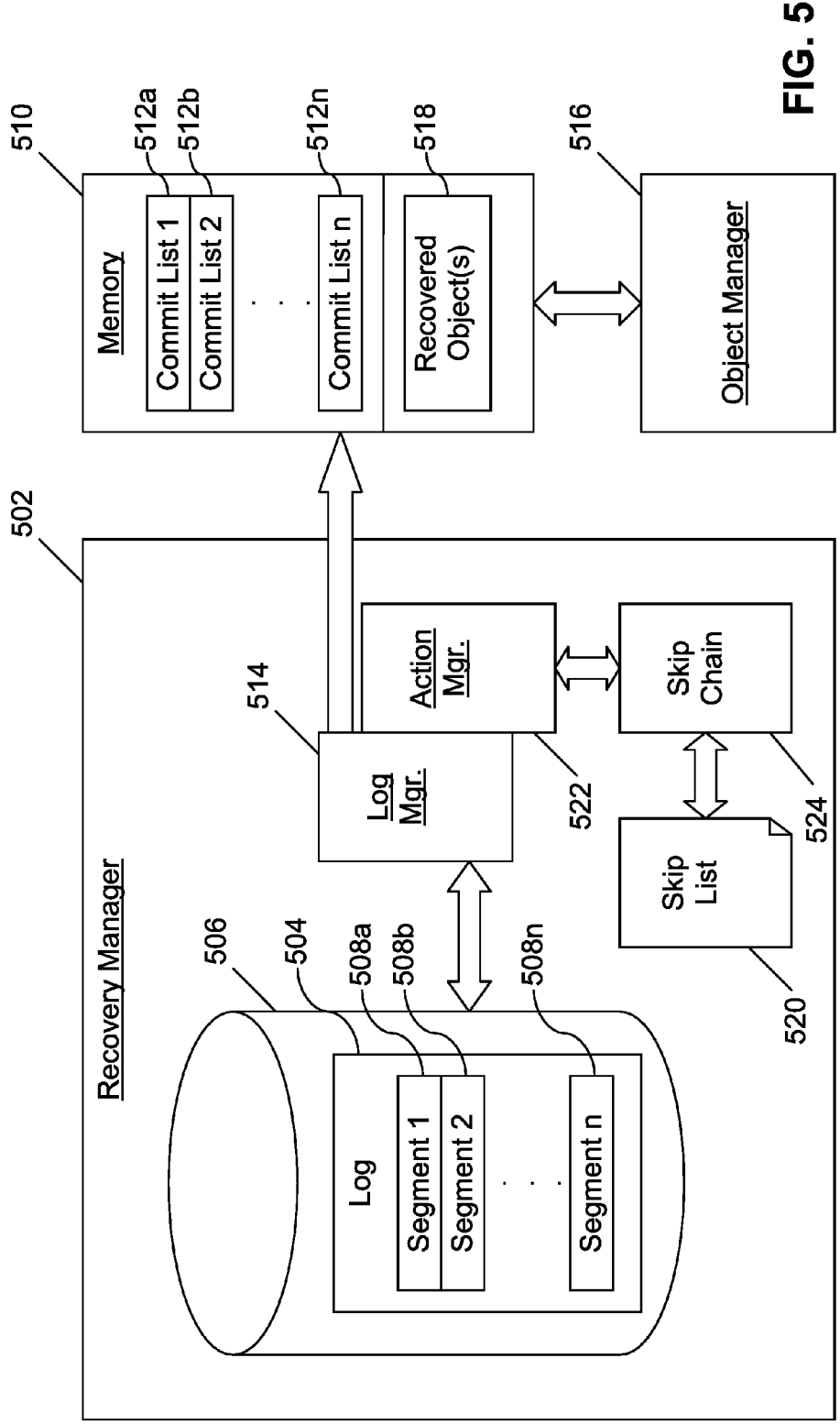
FIG. 5 is a block diagram of an example Fast Restartable Store (FRS) of certain example embodiments.

FIG. 5 is a block diagram of an example FRS of certain example embodiments. The FRS 502 may include or otherwise have access to an append-only log 504 that optionally is divided on disk or other physical storage area 506 as a series of physical segments (files) 508a-508n with sequential names representing a serial time series. Although a sequential integer-based naming system is used in the FIG. 5 example, any suitable naming convention may be used. New segments may be created when a current segment reaches a predetermined size, and/or would reach or exceed that size if more data were added thereto. These segments 508a-508n are loaded into memory 510. Once in memory, the segments are divided into logical partitions or commit lists 512a-n. Commit list boundaries are identified and they are sectioned. Each commit list is then iterated on in reverse order, which is the reverse-chronological order, for playback in connection with the recovery system 502. In other words, once in memory, the contents of the segments 508a-508n are iterated over in reverse order, which is the reverse-chronological order. Maintenance of the log 504, provisioning of the segments 508a-508n, creation of the commit lists 512a-n, etc., may be managed by a log system of LogManager 514. It is noted that commit lists 512a-512n may be provided in memory 510 only temporarily, e.g., during recovery operations.

The recovery system 502 of certain example embodiments replays each action (including insert, remove, and update actions) through an object manager 516 that restores the recovered object 518 in memory 510 in the order presented by the log system 514 (namely, in reverse). Each action has a unique associated identifier or log sequence number (LSN). On updates and removes, the LSN of the removed or replaced item is logged in a list (also sometimes referred to as a skip list with blocked LSNs) 520 of actions that should be blocked from replay through the object manager 516. When the recovery system 502 tries to replay a LSN included in the skip list 520 via the object manager 516, the action is dropped and the LSN removed from the skip list 520. Once the entire log 504 is replayed in reverse order, the recovery is considered complete and the system is transitioned from the recovering state to its normal state.

The recovery process of certain example embodiments is driven by the RecoveryManager 502. High level tasks of the RecoveryManager 502 include obtaining LogRecords in reverse-chronological order from the LogManager 514, extracting Actions from the relevant LogRecords using an ActionManager 522, filtering out irrelevant Actions with a set of filters (e.g., transaction filter, bulk delete filter, etc.) in cooperation with the skip chain 524 and the skip list 520, and replaying Actions on or via the ObjectManager 516. It is noted that certain example embodiments may encounter portions of the skip chain 524 in the log record stream and thus may in some instances use at least some of such portions to maintain the skip list 520. It also will be appreciated that certain example embodiments may maintain the skip list 520 for recovery purposes, but do not necessarily separately maintain the skip chain 524 as a part of the recovery process, per se. Java code associated with an example recovery manager implementation is set forth in the Computer Program Listing Appendix provided below.

The replay order of certain example embodiments will now be discussed in greater detail. As will be appreciated from the description above, in order to fully recover the state of a system from a crash or the like, there are two basic choices for replay order: start from the oldest valid LogRecord and recover forward in time, or start from the newest LogRecord and recover backwards in time.

ARIES and other related protocols typically start recovery with a forward pass. All actions starting from some known checkpoint are performed in order until the current state is reached. Because the system is always moving forward in time, it is possible to perform logical actions (i.e., increment some integer field by 1). By contrast, certain example embodiments reverse the standard paradigm and adopt the route of recovering in reverse-chronological order. An advantage of the approach of certain example embodiments pertains to the ability to skip replaying invalidated actions, thereby yielding a performance boost in many instances.

Figure 6:
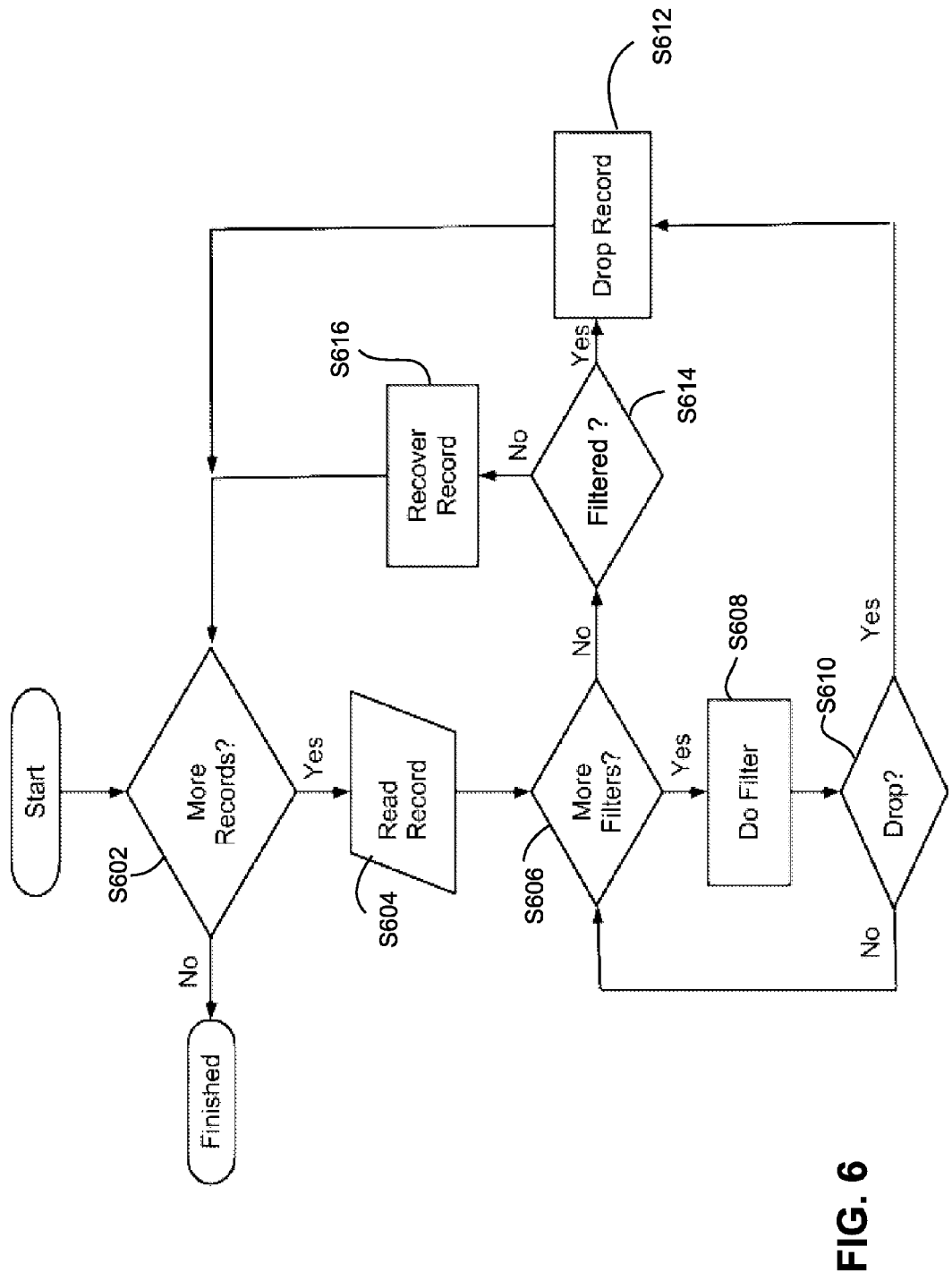
FIG. 6 is a flowchart showing an illustrative recovery process in accordance with certain example embodiments.

FIG. 6 is a flowchart showing an illustrative recovery process in accordance with certain example embodiments. As shown in FIG. 6, while there are more records of actions (as determined by step S602), the next record is read in step S604. While there are more filters to be run on the action (as determined by step S606), then the next filter to be applied is run in step S608. If the current filter indicates that the record should be dropped (as determined by step S610), then the record simply is dropped in step S612, and the process is returned to step S602 to determine whether there are any more records to process.

On the other hand, if the current filter indicates that the record should not be dropped (as determined by step S610), then the process is returned to step S606 so that the next filter is run. If all filters have been run and the determination is made (in step S614) that the record of the action should not be dropped, then the record is recovered in step S616 and the process is returned to step S602 to determine whether there are any more records to process. The control loop continues until the process has finished processing all records (as determined by step S602).

To facilitate the reverse-chronological order replay action of certain example embodiments, several concepts may be implemented. These concepts in certain example embodiments include skip chains, where a given LogRecord includes a reference to a previous LogRecord that it invalidates; an "all physical actions" property, indicating that all actions should be self-contained, inasmuch as a previous state cannot be depended on; and/or a set of one or more action filters, through which actions are passed to determine validity before being replay.

To prevent the replaying of irrelevant actions, a skip chain may be maintained for each logical item in the log. The skip chain may be thought of as connecting the records for a given key in reverse-chronological order. The head of the skip chain is the current live record, and it is then connected to all previous records for that key that are clearly "dead." Each LogRecord wrapping an Action on, or associating an Action to, an item will have a reference (LSN) to the previous LogRecord for the item.

In this vein, FIG. 7 schematically shows skip chains in accordance with certain example embodiments. Each LSN entry has at least one key that stores a key/value pair, listing the operation type (e.g., put, remove, etc.) and the value of the LSN for the previous LogRecord for the item that associated with the action of that current LSN. Multiple keys may be provided for each LSN in some instances, as a single action might affect multiple system objects in some cases (e.g., such as a directory including one or more files being deleted from a system). As can be appreciated from FIG. 7, the action associated with LSN 2 removes an object generated via the action associated with LSN 1. Similarly, the action associated with LSN 5 overwrites or otherwise updates an object generated via the action associated with LSN 3. The actions associated with LSNs 1, 3, and 4 do not take actions that affect any other objects and, as a result, the value in the key/value pair for these LSNs indicates an out-of-bounds index (−1) to signal this fact. Of course, any other suitable flag may be used in place of or in addition to a value of −1. In any event, although the actions associated with LSNs 1 and 3 likely made sense when the process was being run, recovery operations could be made more efficient by simply skipping such actions because they end up being irrelevant anyway (e.g., by virtue of the actions associated with LSNs 2 and 5 respectively).

Figure 8:
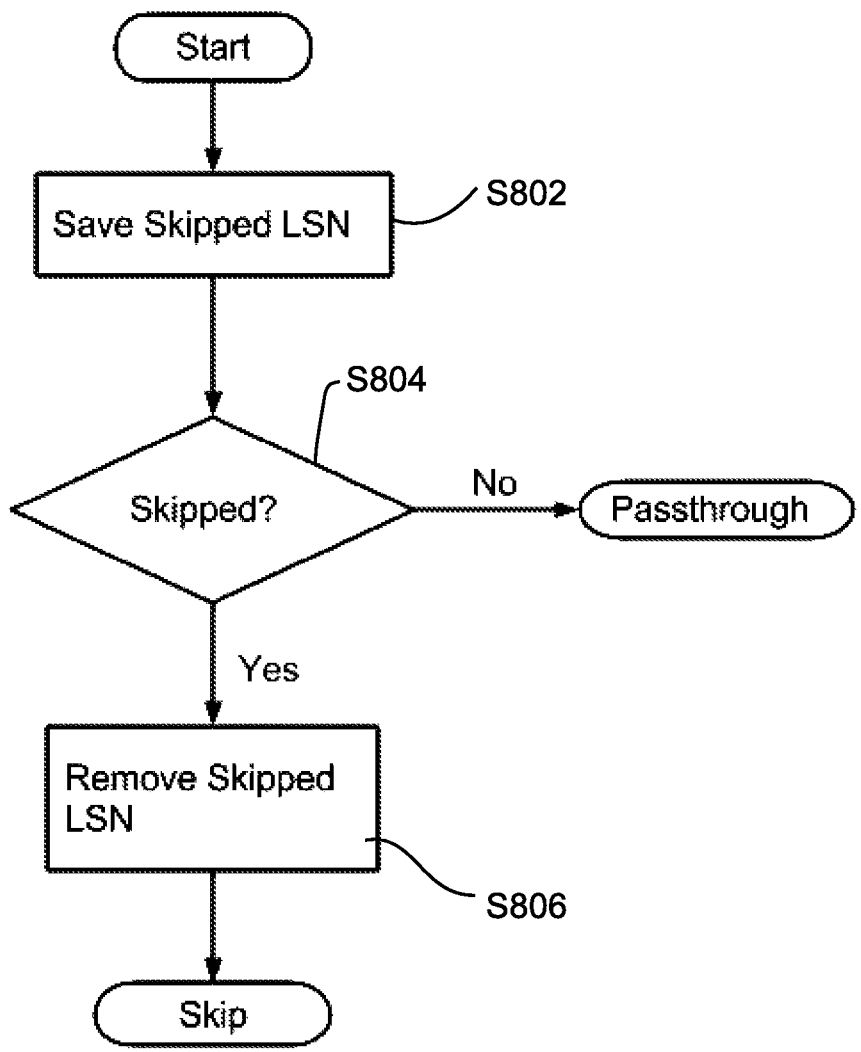
FIG. 8 is a flowchart showing an illustrative skip filter process in accordance with certain example embodiments.

As backwards recovery takes place, the process of FIG. 8 (which is a flowchart showing an illustrative skip filter process in accordance with certain example embodiments) may take place. That is, as backwards recovery takes place, for each LogRecord, if the LogRecord's previous LSN is not null (or not set to −1 in the example above), then the LogRecord's previous LSN is added to the skip list in step S802 and thus effectively removed from replaying. If the current LogRecord's LSN is not in the skip list (as determined in step S804), then the LogRecord is sent or otherwise passed through to the rest of the recovery system. On the other hand, if the current LogRecord's LSN is in the skip list (as determined in step S804), then the action associated with the LogRecord is skipped and its LSN is removed from the skip list in step S806.

Action filters will be fed the stream of valid actions (in reverse-chronological order) from which certain example embodiments will determine what actions are valid. All actions are passed completely through the filter chain. When a filter determines that a particular action is invalid, the action may be flagged as being invalid before continuing its way down the chain. For example, assume that the transaction action filter is given the following inputs:

Commit TxnID=3
TransactionalAction TxnID=3 [Put (k1, v1)]
TransactionalAction TxnID=2 [Remove (k2, v2)]
Begin TxnID=3
Begin TxnID=2

In this situation, the transactional action filter will pass through: Put (k1, v1).

Figure 9:
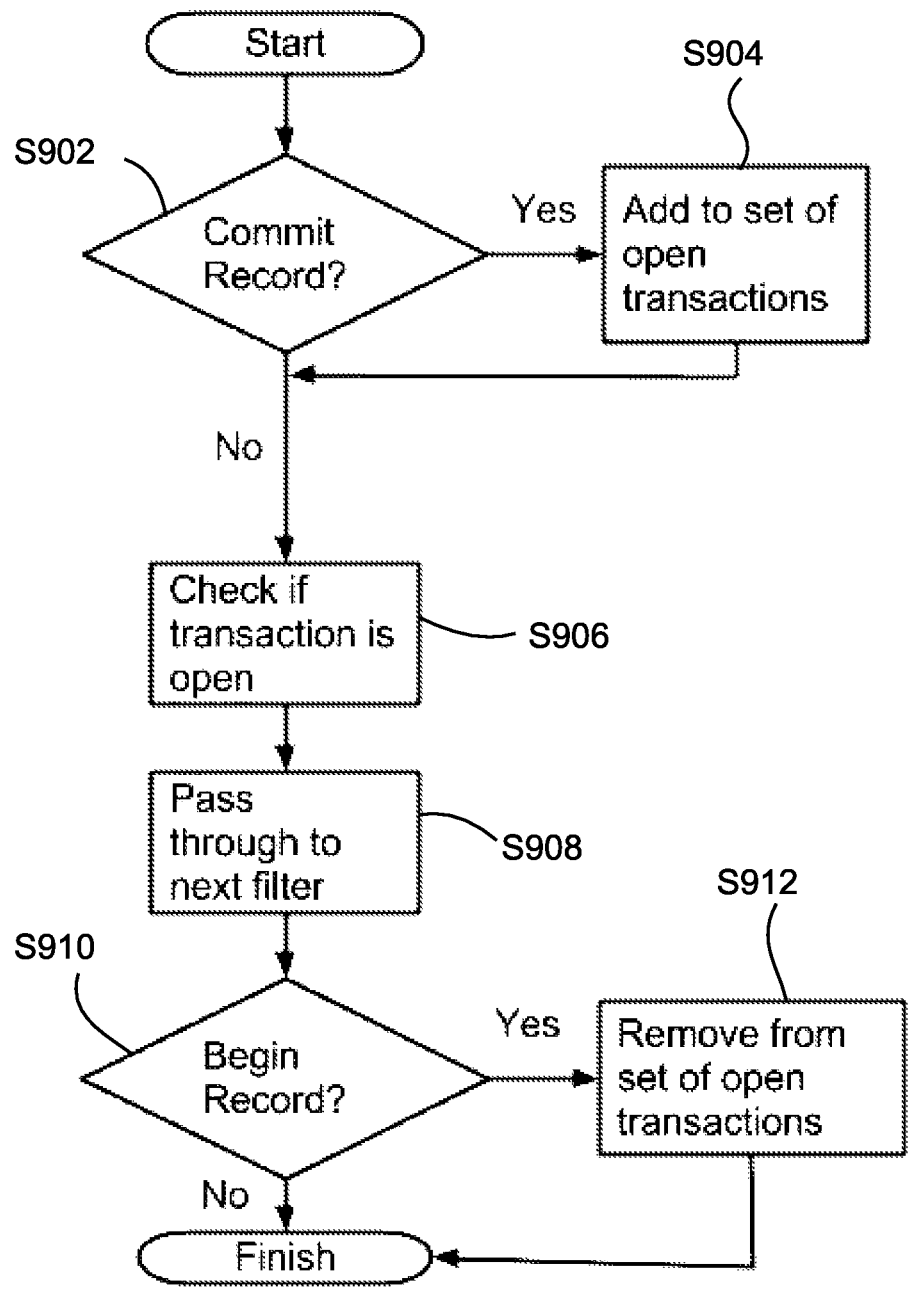
FIG. 9 is a flowchart showing an illustrative transaction filter process in accordance with certain example embodiments.

FIG. 9 is a flowchart showing an illustrative transaction filter process in accordance with certain example embodiments. As with other filters, the transaction filter may process records in reverse order. For instance, for a typical transaction performing open, put, commit operations in this order, the filter will "see" commit, put, open operations, in this order. There are three common situations that may be encountered while processing records, including transaction control records (e.g., being, commit, etc.), transactional actions (e.g. a put that is part of a transaction), and non-transaction actions. Non-transactions actions may be simply passed through the filter. When a commit record is encountered (e.g., as determined by step S902), its transaction identifier is added to the set of open transactions in step S904. Similarly, when a transaction open (beginning) is encountered (e.g., as determined in step S910), its transaction identifier is removed from the set of open transactions in step S912. Transactional actions may be passed through to the next filter, regardless of whether or not they were part of an open transaction (e.g., in step S906). As can be appreciated from FIG. 9 and from step S906 in particular, information concerning whether the transactional action is part of an open transaction may be used to determine whether it will be flagged as filtered.

Figure 10:
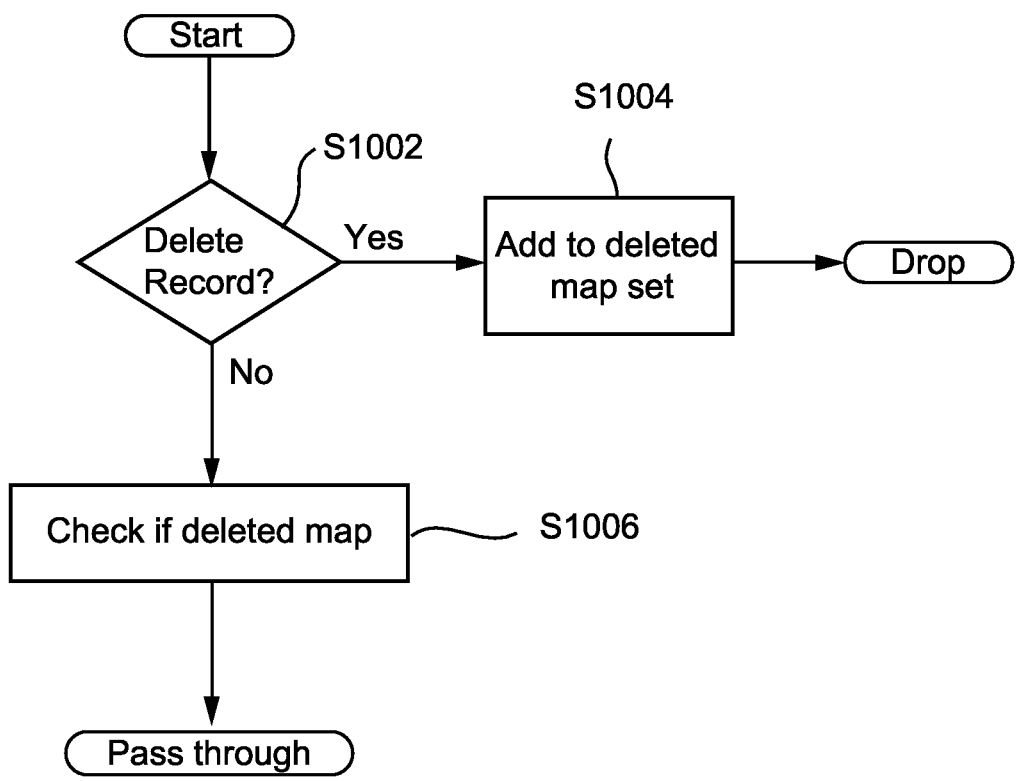
FIG. 10 is a flowchart showing an illustrative delete filter process in accordance with certain example embodiments.

FIG. 10 is a flowchart showing an illustrative delete filter process in accordance with certain example embodiments. The delete filter passes actions through until it reaches a delete record. However, when it sees a delete record (e.g., as determined in step S1002), it adds the identifier to be deleted to its delete set in step S1004, and then drops the record from further processing (e.g., so that nothing else can happen with a delete record). On the other hand, for each record the delete filter passes through, the record's identifier will be checked in step S1006. If the identifier is part of the deleted identifier set, the record will be marked as filtered.

Certain example embodiments may use Terracotta Big Memory caching to store some or all of the log, and/or to help handle some or all of the information that is stored in the memory 510 of FIG. 5 (such as, for example, the segments 508a-508n, the commit lists 512a-n, etc.), in off-heap memory. See, for example, U.S. Publication No. 2012/0222005, for a description of such example techniques. The entire contents of this published patent application are hereby incorporated herein by reference. It is noted that the example techniques described herein may be used in a wide variety of applications involving Big Data applications (e.g., applications that involve terabyte or larger scales of data) where efficient recovery is desired.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

COMPUTER PROGRAM LISTING APPENDIX

```
/*
 * All content herein copyright © 2012 Terracotta Inc., except as may
 * otherwise be noted in a separate copyright notice. All rights reserved.
 */
package com.terracottatech.frs.recovery;
import com.terracottatech.frs.DeleteFilter;
import com.terracottatech.frs.action.Action;
import com.terracottatech.frs.action.ActionManager;
import com.terracottatech.frs.config.Configuration;
import com.terracottatech.frs.config.FrsProperty;
import com.terracottatech.frs.log.LogManager;
import com.terracottatech.frs.log.LogRecord;
import com.terracottatech.frs.transaction.TransactionFilter;
import com.terracottatech.frs.util.NullFuture;
import java.io.File;
import java.util.Iterator;
import java.util.concurrent.*;
/**
 * @author tim
 */
public class RecoveryManagerImpl implements RecoveryManager {
  private final LogManager logManager;
  private final ActionManager actionManager;
  private final boolean compressedSkipSet;
  private final ReplayFilter replayFilter;
  public RecoveryManagerImpl(LogManager logManager,
    ActionManager actionManager, Configuration configuration) {
      this.logManager = logManager;
      this.actionManager = actionManager;
      this.compressedSkipSet = configuration.getBoolean (FrsProperty.
      RECOVERY_COMPRESSED_SKIP_SET);
      this.replayFilter = new ReplayFilter(configuration.getDBHome( ));
  }
  @Override
  public Future<Void> recover(RecoveryListener ... listeners) throws
      RecoveryException, InterruptedException {
        Iterator<LogRecord> i = logManager.startup( );
        long filter = 0;
        long put = 0;
        long ntime = System.nanoTime( );
        Filter<Action> deleteFilter = new DeleteFilter(replayFilter);
        Filter<Action> transactionFilter = new TransactionFilter
        (deleteFilter);
        Filter<Action> skipsFilter = new SkipsFilter(transactionFilter,
        logManager.lowestLsn( ), compressedSkipSet);
        long lastRecoveredLsn = Long.MAX_VALUE;
        try {
          while (i.hasNext( )) {
            LogRecord logRecord = i.next( );
            Action action = actionManager.extract(logRecord);
```

COMPUTER PROGRAM LISTING APPENDIX

```
            skipsFilter.filter(action, logRecord.getLsn( ), false);
            lastRecoveredLsn = logRecord.getLsn( );
          }
        } finally {
          replayFilter.finish( );
        }
        for (RecoveryListener listener : listeners) {
          listener.recovered( );
        }
        logManager.recovered( );
        return new NullFuture( );
      }
    private static class ReplayFilter implements Filter<Action> {
      private final File dbHome;
      private long replayed = 0;
      ReplayFilter(File dbHome) {
        this.dbHome = dbHome;
      }
      public long getReplayCount( ) {
        return replayed;
      }
    @Override
      public boolean filter(final Action element, final long lsn,
      boolean filtered) {
        if (filtered) {
          return false;
        } else {
          element.replay(lsn);
          return true;
        }
      }
      void finish( ) throws InterruptedException {
      }
    }
}
```

What is claimed is:

1. A recovery method for a computer system including a processor and a memory that has encountered a fault, the method comprising:
   loading to the memory actions taken by the computer system from a write-ahead log maintained on a non-transitory computer readable storage medium, the write-ahead log storing the actions in chronological order;
   running the actions stored in the memory through at least one filter in order to identify irrelevant actions that do not need to be replayed in order to recover from the fault;
   replaying, using the processor, the actions from the memory until the entire log is replayed in reverse-chronological order, except for identified irrelevant actions that do not need to be replayed, wherein the replaying comprises causing the computer system to take a subset of the same actions stored in the memory again; and
   transitioning the computer system from a recovery state to a normal operation state, following the replaying.

2. The method of claim 1, wherein there is no data dependency between actions recorded in the write-ahead log, and the log is maintained such that older actions cannot invalidate newer actions.

3. The method of claim 1, wherein:
   the write-ahead log is divided into a plurality of physical segments;
   wherein the loading is practiced by:
      loading the segments from the write-ahead log into the memory in reverse-chronological order,
      dividing the segments, once in memory, into logical partitions,
      identifying boundaries in the logical partitions,
      dividing the actions in the logical partitions into commit lists, and reversing the order of the actions in the commit lists; and
wherein the replaying comprises iterating over the actions in the commit lists.

4. The method of claim 1, wherein the write-ahead log is divided into a plurality of physical files having sequential names representing a serial time series.

5. The method of claim 1, wherein each said action has a corresponding type belonging to the list comprising including insert, remove, and update actions.

6. The method of claim 5, wherein each said action has a unique log sequence number (LSN) associated therewith.

7. The method of claim 6, further comprising:
when remove and update type actions are being replayed, logging in a list of actions that should be blocked from replay, the LSN of the removed/updated action;
in connection with the replaying, determining whether the LSN for the action about to be replayed is present in the list of actions that should be blocked from replay and, if so, ignoring the action and removing the LSN from the list of actions that should be blocked.

8. The method of claim 1, wherein each said filter has a corresponding type belonging to the list comprising skip, transaction, and delete filters.

9. The method of claim 1, wherein the actions loaded from the write-ahead log are mutative actions on objects that occurred between a predetermined time before the fault, and the fault.

10. The method of claim 1, wherein the write-ahead log stores entries for the actions, and each individual entry includes a field that can be used to reference a previous entry that that entry invalidates.

11. The method of claim 10, wherein the field is a key/value pair that identifies an operation type and a unique identifier of the previous entry.

12. A non-transitory computer readable-storage medium tangibly storing instructions that, when performed by a processor of a computer system that needs to be recovered as a result of a fault taking place, at least:
load actions taken by the computer system from a disk-backed log that stores the actions in chronological order, to memory of the computer system, wherein the actions loaded from the log are mutative actions that occurred within a time period of interest defined as being between a predetermined time before the fault and the fault;
run the actions stored in the memory through at least one filter in order to identify irrelevant actions that do not need to be replayed in order to recover from the fault;
replay, using the processor, the actions from the memory until the entire log for the time period of interest is replayed in reverse-chronological order, except for the identified irrelevant actions that do not need to be replayed, wherein the replay comprises causing the computer system to take a subset of the same actions stored in the memory again; and
transition the computer system from a recovery state to a normal operation state, following the replay,
wherein there is no data dependency between actions recorded in the log and the log is maintained such that older actions cannot invalidate newer actions.

13. A computer system operable in normal and recovery modes, comprising:
a processor and a memory;
a non-transitory computer readable storage medium tangibly storing a log that stores actions of preselected types taken by the computer system in chronological order;
recovery program logic configured to operate in connection with the processor when the computer system is in recovery mode to load actions from the log into the memory and filter out irrelevant actions that do not need to be replayed;
an object manager configured to cooperate with the processor when the computer system is in recovery mode to restore objects in memory in reverse-chronological order by replaying the actions from the memory in reverse-chronological order, wherein the replaying comprises causing the computer system to take a subset of the same actions stored in the memory again,
wherein the processor is further configured to (a) place the computer system in recovery mode when a fault is detected and (b) transition the computer system from recovery mode to normal mode once the object manager has finished replaying all of the actions that occurred within a time period of interest leading up to the fault, except for the filtered out irrelevant actions.

14. The computer system of claim 13, wherein there is no data dependency between actions recorded in the log and/or the log is maintained such that older actions cannot invalidate newer actions.

15. The computer system of claim 13, wherein the log is divided into a plurality of physical files having sequential names representing a serial time series.

16. The computer system of claim 13, wherein each said action has a corresponding type belonging to the list comprising including insert, remove, and update actions.

17. The computer system of claim 16, wherein each said action has a unique log sequence number (LSN) associated therewith.

18. The computer system of claim 17, wherein:
the recovery program logic is further configured to log in a list of actions that should be blocked from replay, the LSN of removed and updated actions;
the object manager, in connection with action replays, is further configured to determine whether the LSN for the action about to be replayed is present in the list of actions that should be blocked from replay and, if so, ignore that action and remove its LSN from the list of actions that should be blocked.

19. The computer system of claim 13, wherein each said filter is a skip, transaction, or delete filter.

20. The computer system of claim 13, wherein the log stores entries for the actions, each given entry including a field that can be used to reference a previous entry that the given entry invalidates by storing a key/value pair identifying an operation type and a unique identifier of the previous entry.

* * * * *